United States Patent
Rossmann (10) Patent No.: US 7,895,588 B2
(45) Date of Patent: Feb. 22, 2011

(54) SYSTEM AND METHOD FOR DETECTING AND CERTIFYING MEMORY LEAKS WITHIN OBJECT-ORIENTED APPLICATIONS

(75) Inventor: Albert P. Rossmann, Wiesloch (DE)

(73) Assignee: SAP AG, Walldorf (DE)

( * ) Notice: Subject to any disclaimer, the term of this patent is extended or adjusted under 35 U.S.C. 154(b) by 1266 days.

(21) Appl. No.: 11/018,058

(22) Filed: Dec. 20, 2004

(65) Prior Publication Data

US 2006/0136530 A1    Jun. 22, 2006

(51) Int. Cl.
G06F 9/44 (2006.01)
G06F 9/45 (2006.01)

(52) U.S. Cl. .................. 717/162; 717/127; 717/130; 717/131; 717/148; 717/166

(58) Field of Classification Search ............ None
See application file for complete search history.

(56) References Cited

U.S. PATENT DOCUMENTS

| | | | | |
|---|---|---|---|---|
| 6,529,919 | B1 * | 3/2003 | Agesen et al. | 707/206 |
| 6,938,245 | B1 * | 8/2005 | Spertus et al. | 717/127 |
| 7,072,905 | B2 * | 7/2006 | Garthwaite | 707/103 Y |
| 2004/0181782 | A1 * | 9/2004 | Findeisen | 717/130 |
| 2005/0102255 | A1 * | 5/2005 | Bultman | 707/1 |

OTHER PUBLICATIONS

Quest Software, *JProbe® Improve Developer Productivity And Increase Java Application Performance*, 2004, pp. 1-2, http://www.quest.com/jprobe.

Quest Software, *White Papers*, pp. 1-5, http//wm.quest.com/library/.

Wily Technology, Inc., *Wily Technology's Java Application Management White Papers*, 1999-2005, pp. 1-5, http://wilytech.com/solutions/library/index.php.

ej-technologies, *JProfiler*, 2005, pp. 1, http://www.ej-technologies.com/products/jprofiler/ocerview.html.

ej-technologies, *Press Releases*, 2005, pp. 1-2, http://www.ej-technologies.com/company/press.html.

USENIX, *Compendium of Best Papers*, Dec. 6, 2004, pp. 1-19, http://www.usenix.org/publications/library/proceedings/best_papers.html.

Saswat Anand, "Memory Leak in Java" printed Dec. 2, 2004, pages 2, http://home.cc.gatech.edu/saswat/15.

Venners, Bill, "The Lean, Mean, Virtual Machine", JavaWorld, Jun. 1996, 3 pages, http://www.javaworld.com/javaworld/jw-06-1996/jw-06-vm_p.html.

(Continued)

*Primary Examiner*—Chuck O Kendall
(74) *Attorney, Agent, or Firm*—Schwegman, Lundberg & Woessner, P.A.

(57) ABSTRACT

A method is described by defining one or more classes within a software application as being in scope, any class not defined as being in scope are defined as being out of scope, all classes comprise at least one method. The method further determines an amount of allocated memory for each of said in scope classes and said out of scope classes. Lastly, if one of said methods from one of said out of scope classes are called as a result of the calling of one of the in scope classes, adding said allocated memory from said out of scope class to said allocated memory of said in scope class.

9 Claims, 8 Drawing Sheets

OTHER PUBLICATIONS

Venners, Bill, "the Java Class File Lifestyle", JavaWorld, Jul. 1996, 4 pages, http://www.javaworld.com/javaworld/jw-07-1996/jw-07-classfile-p.html.

Venners, Bill, "Java's Garbage-Collected Heap", JavaWorld, Aug. 1996, 6 pages, http://www.javaworld.com/javaworld/jw-08-1996/jw-08-gc_p.html.

Java Q&A Experts"Java Memory Management", JavaWorld, Aug. 1999, 3 pages, http://www.javaworld.com/javaqa/1999-08/04-qa-leaks_p.html.

Patrick, Jim, Handling Memory Leaks In Java Programs, IBM, printed Dec. 5, 2004, 7 pages, http://www-128.ibm.com/developerworks/java/library/j-leaks.

* cited by examiner

SYSTEM AND METHOD FOR DETECTING AND CERTIFYING MEMORY LEAKS WITHIN OBJECT-ORIENTED APPLICATIONS

BACKGROUND

1. Field of the Invention

This invention relates generally to the field of data processing systems. More particularly, the invention relates to an improved system and method for monitoring and certifying the performance of object-oriented applications such as Java applications.

2. Background

The physical memory on any computing system is a limited resource. No matter how fast computing systems become, they always depend upon a finite amount of memory in which to run their software applications. As a result, software developers should consider this resource when writing and developing software applications.

The Java programming language differs from many traditional programming languages (e.g., C/C++) by the way in which memory is allocated and deallocated. In languages like C/C++, memory is explicitly allocated and deallocated by the application programmer/developer. This can greatly increase the time spent by programmers in tracking down coding defects in regards to deallocating memory.

By contrast, the Java runtime environment (i.e., Java virtual machine) provides a built-in mechanism for allocating and deallocating memory. In Java, memory is allocated to objects. The Java virtual machine (hereinafter "VM") automatically handles the amount and allocation of memory upon an object's creation. The Java runtime environment employs a "garbage collector" (hereinafter "GC") to reclaim the memory allocated to an object once the GC determines that the object is no longer accessible (e.g., referenced or linked by any other objects). When objects in a Java application are no longer referenced, the heap space the object occupied must be recycled so that the space becomes available for subsequently-created objects.

One problem, which may result from the garbage collection process is referred to as a "memory leak." A memory leak can occur when a program (or in the case of Java, the VM) allocates memory to an object but never (or only partially) deallocates the memory when the object is no longer needed. As a result, a continually increasing block of memory may be allocated to the object, eventually resulting in an "Out of Memory" (hereinafter "OOM") error.

Memory leaks are of particular concern on Java-based systems (e.g., J2EE platforms) which are meant to run 24 hours a day, 7 days a week. In this case, memory leaks, even seemingly insignificant ones, can become a major problem. Even the smallest memory leak in code that runs 24/7 may eventually cause an "OOM" error, which can bring down the VM and its applications.

Knowing how to track down memory leaks is essential to solid program design. There are many performance and/or debugging tools that are used to monitor and examine software applications to determine resource consumption as these applications are executing within the Java runtime environment. For example, a profiling tool may identify the most frequently executed methods and objects created in an application. Such a tool may also identify those objects which have the most memory allocated to them.

Another type of software performance and debugging tool is a "tracer." Tracers use different techniques to provide information indicating the execution flows for a running program. One technique keeps track of particular sequences of instructions by logging certain events as they occur. For example, a trace tool may log every entry into, and every exit from, a module, subroutine, method, function, or system component. Typically, a time-stamped record is produced for each such event. Corresponding pairs of records similar to entry-exit records also are used to trace execution of arbitrary code segments, starting and completing I/O or data transmission, and for many other events of interest.

An important aspect of many tracer and/or profiling tools is memory leak detection. Many tools in the market are capable of such detection, but only in limited ways. Many tools in the prior art of capable of informing the developer where memory leaks occur, but only in the sense of what objects are causing the problem. However this information can be of little use to a developer if the underlying code lines or classes that created the objects are not identified. This leaves developers with often-insurmountable amounts of code to peruse through to find the specific class and method calls, etc, causing the problem. Further, although prior tools provide statistics on the memory allocation for all objects within a running application, such information may not be useful for an application that comprises 1000s of objects.

Therefore, it would be advantageous to provide a method and system for accurate memory leak detection in an object-oriented environment. In particular, it would be advantageous to allow such a system to automatically analyze the output provided, so as to reduce the manual analysis required by developers, especially if the returned information includes massive amounts of data which would otherwise be manually reviewed.

SUMMARY

A method is described by defining one or more classes within a software application as being in scope, any class not defined as being in scope are defined as being out of scope, all classes comprise at least one method. The method further determines an amount of allocated memory for each of said in scope classes and said out of scope classes. Lastly, if one of said methods from one of said out of scope classes are called as a result of the calling of one of the in scope classes, adding said allocated memory from said out of scope class to said allocated memory of said in scope class.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for monitoring and certifying memory leaks within object-oriented software applications. Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Scope and Aggregation of Memory Allocation

Java applications can vary in both size and complexity. In addition, certain large Java application (e.g., ~10,000 classes and ~1000,000 methods with ~100,000,000 method calls) may run 24/7 ("long living" applications). Within a long living application, memory leaks can become major problems in terms of both stability and performance. For example, a single long living object that increases in size by 1 byte between each GC cycle will eventually cause the application and VM to crash due to an "OOM" error. Although such a crash may take a long time (e.g., 1 bytes per GC cycle*millions of free bytes of memory), it will inevitably occur.

As described above, existing monitoring tools can identify objects that are growing in size. However, if an application contains 1000s of objects and classes, such information can be useless without a significant amount of manual analysis. Knowing which object(s) is leaking is only the first step. A developer is then typically required to analyze a significant amount of data to determine where exactly in the code the leak is occurring (e.g., within which specific classfile).

Figure 1:
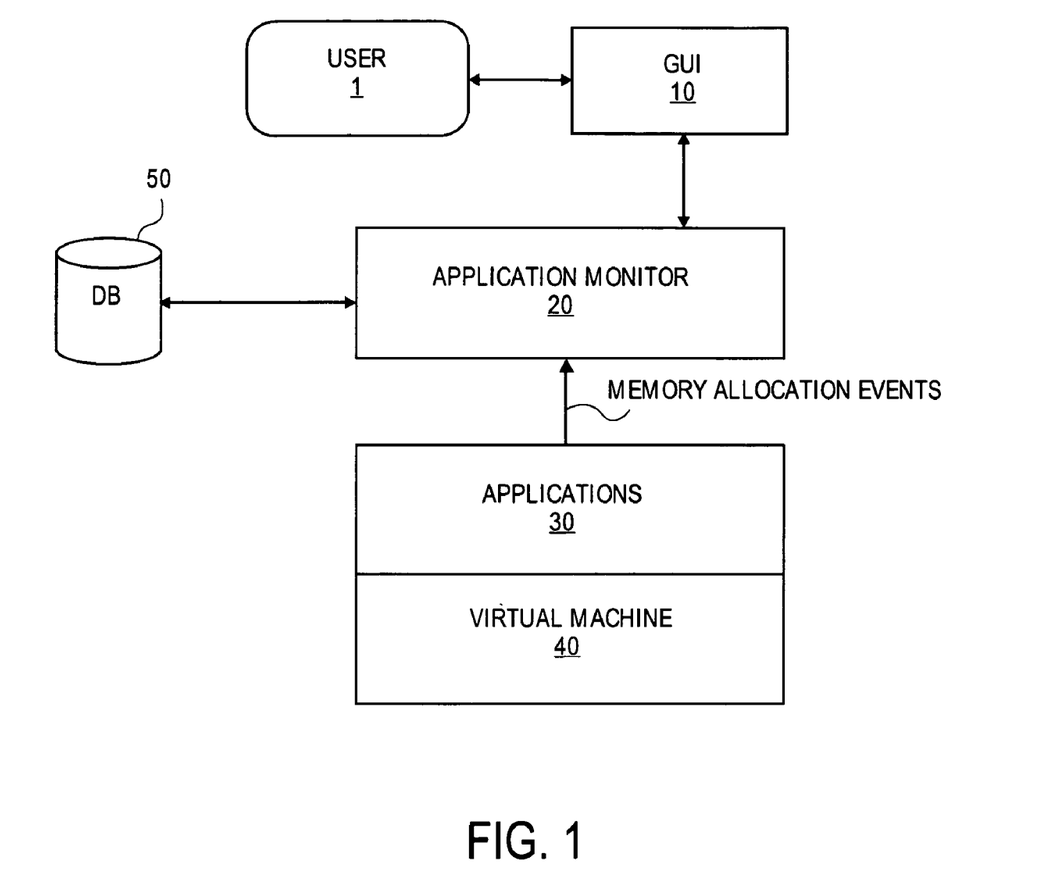
FIG. 1 illustrates a high-level view of a monitoring application interacting with a GUI and objected-oriented applications.

In one embodiment of the invention, illustrated generally in FIG. 1, an application monitor module 120 reduces the amount of data a developer needs to review in order to identify the specific code location within an application 130 that is responsible for a memory leak. In this embodiment, the developer may configure the application monitor 120 to monitor a specific subset of classes of the application 130. The specific subset of classes selected for memory allocation monitoring is referred to herein as the monitoring "scope." All memory allocations that occur outside of the scope may be aggregated together (as described below), but will not be provided directly to the developer.

In one embodiment, in order to link memory allocation to a particular class, all memory allocation statements (e.g., a call for the creation of a new object) in the application 130 are intercepted and the calling method is determined. The class containing the method is charged for the allocated amount of memory. For each subsequent invocation, the byte values are added up until the next GC cycle occurs. For example, if a single monitored class makes calls to eight different methods, it is possible for dozens of objects to be created. The allocation of memory for each of these objects is aggregated and associated with the single monitored class.

As indicated in FIG. 1, the application monitor 20 may display the results of the memory allocations for the end user 01 via a graphical user interface ("GUI") 10 and/or may store the results within a database 50 for subsequent retrieval and analysis. The applications 30 illustrated in FIG. 1 are object-oriented applications designed to run on a virtual machine 40, such as a Java 2 Enterprise Edition ("J2EE") server. It should be noted, however, that the underlying principles of the invention may be implemented within any type of object-oriented environment.

Figure 2:
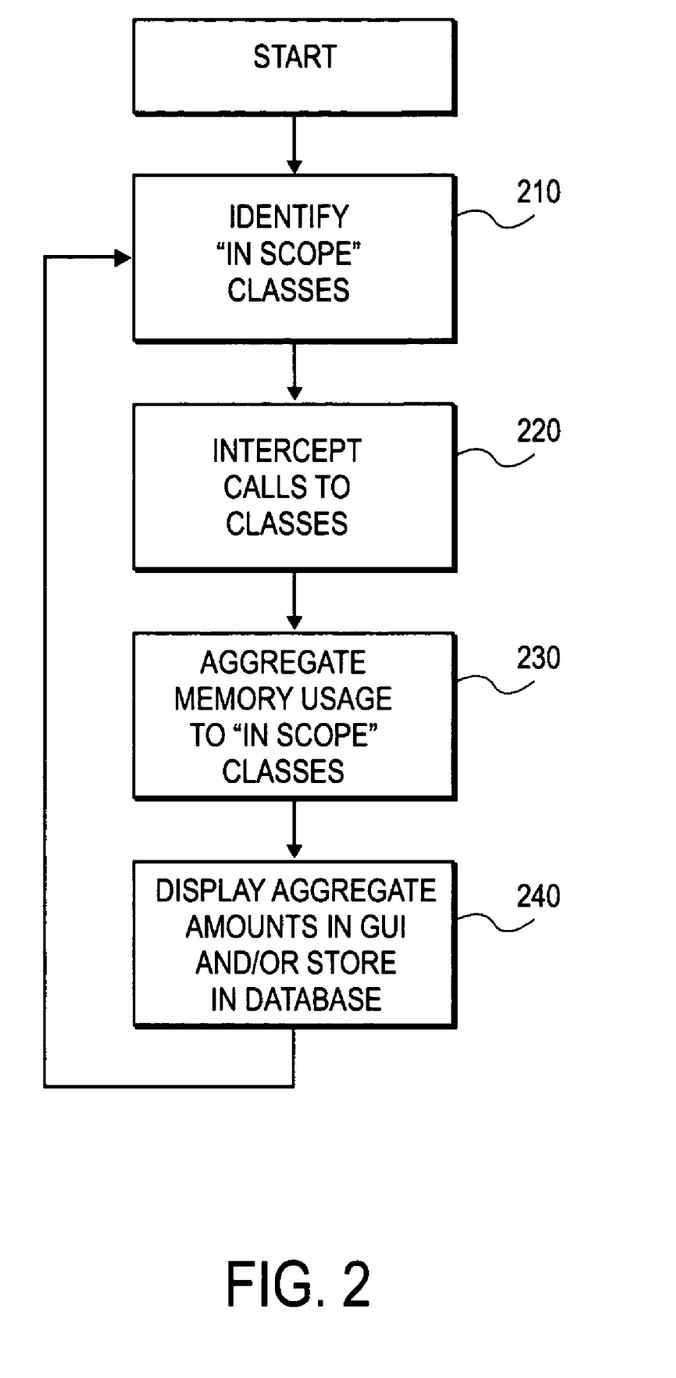
FIG. 2 illustrates high level process of how a monitoring application tracks memory allocation of targeted classes.

FIG. 2 is a high level flow chart describing the operation of the application monitor 20 according to one embodiment of the invention. First, the user identifies the "in scope" classes 210 that are to be monitored. Next, the monitoring application intercepts method calls made to the "in scope" classes 220. Specifically, calls made to any methods of the "in scope" classes are intercepted as well as calls made to "out of scope" classes called as a result of the "in scope" classes (i.e., for which memory allocations will be aggregated to the "in scope" classes). Next, the application monitor 20 aggregates the memory usage to each "in scope" class 230. Aggregation includes the summing of the memory usage of "out of scope" classes identified in step 220 above to the "in scope" classes. Next, the aggregated amounts are displayed on a GUI and/or stored in a database 240.

One particular example of system operation will be described with respect to FIGS. 3A-3C which shows call graphs for a portion of an application that implements a simple model-view-controller ("MVC") architecture. Specifically, the application includes the classes: LibraryController 110, LibraryModel 120, and LibraryView 140 and for the MVC part and a class BookManager 130 that is used by the model to store data in a database. For some methods the implementation has been omitted for simplicity reasons. Moreover, it should be noted that the memory requirements used in this example do not reflect the real values that the example program would actually produce. Simple numbers have been chosen to make calculations easier. The code for this architecture is provided in the Appendix at the end of this detailed description.

In operation, as a call to a single method is made, memory allocations are made for multiple classes. The Application Monitor intercepts the memory allocations for each class and records the respective amounts. Thus, as illustrated generally in FIG. 3A, when a method call 105 to the LibraryController class 110 is made, memory is allocated to the class Library-View 110 in the amount of 36 bytes. The calling of the first method 105 triggers the calling of a second method 140 contained in class LibraryModel 120 and memory is again allocated to class LibraryModel 120 in the amount of 40 bytes. A third method 150 is then called from class BookManager 130 and memory is allocated to class BookManager 130 in the amount of 54 bytes.

Figure 3A:
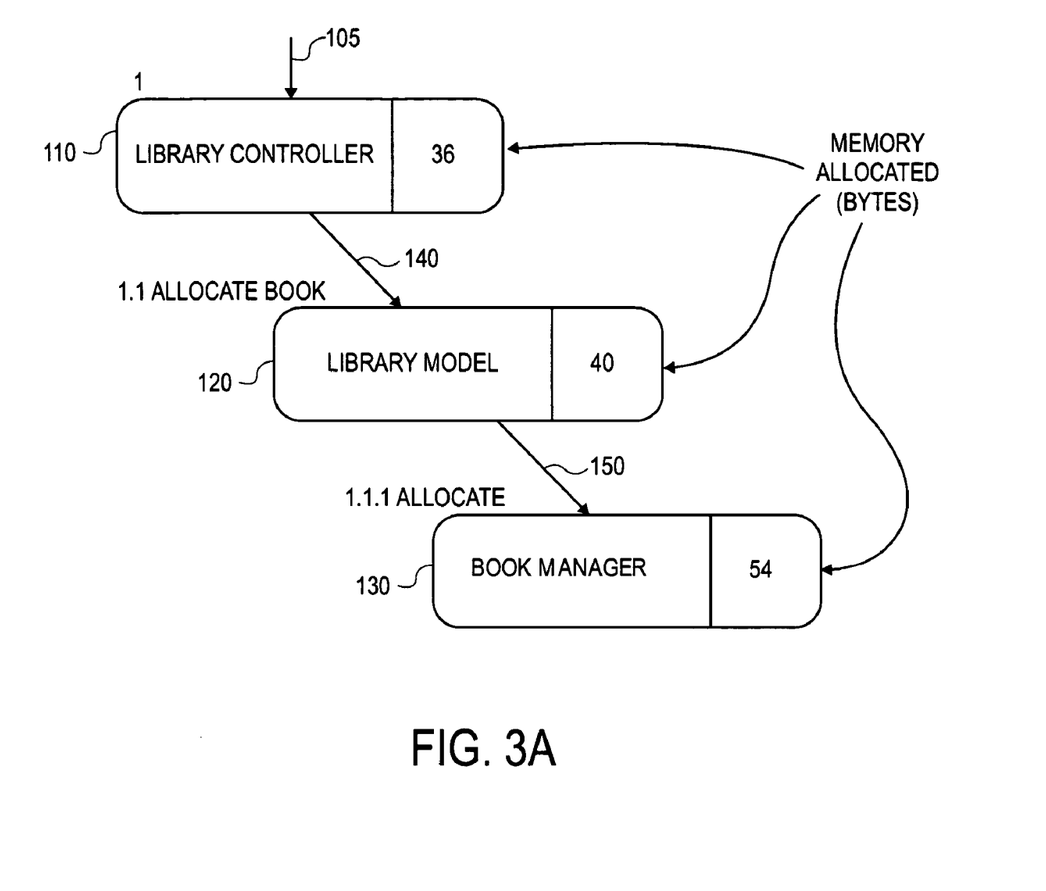
FIG. 3A illustrates one embodiment in which memory allocation can be tracked by a monitoring application.

From FIG. 3A, it is easy to identify the number of bytes each class consumes. Providing such detailed results is important to investigate memory leaks. However, with an application that contains 1000s of classes, there is simply too much data for a developer to analyze to identify the source of a memory leak. In an alternate embodiment, a developer may select the most important classes and summarize all allocations that are out of scope. This embodiment allows for filtering of chosen classes, such that these chosen classes undergo individual measurement during run-time. Classes that are not in the scope of the filter do not undergo individual measurement. Instead, their memory allocations are aggregated and stored until a method of a monitored class is reached. Once one of the methods (from a monitored class) makes a call to an unmonitored class, all the allocated memory from the unmonitored class is charged to the monitored class. In other words, any monitored class inherits the memory allocation occurring during calls to methods of an unmonitored class.

Figure 3B:
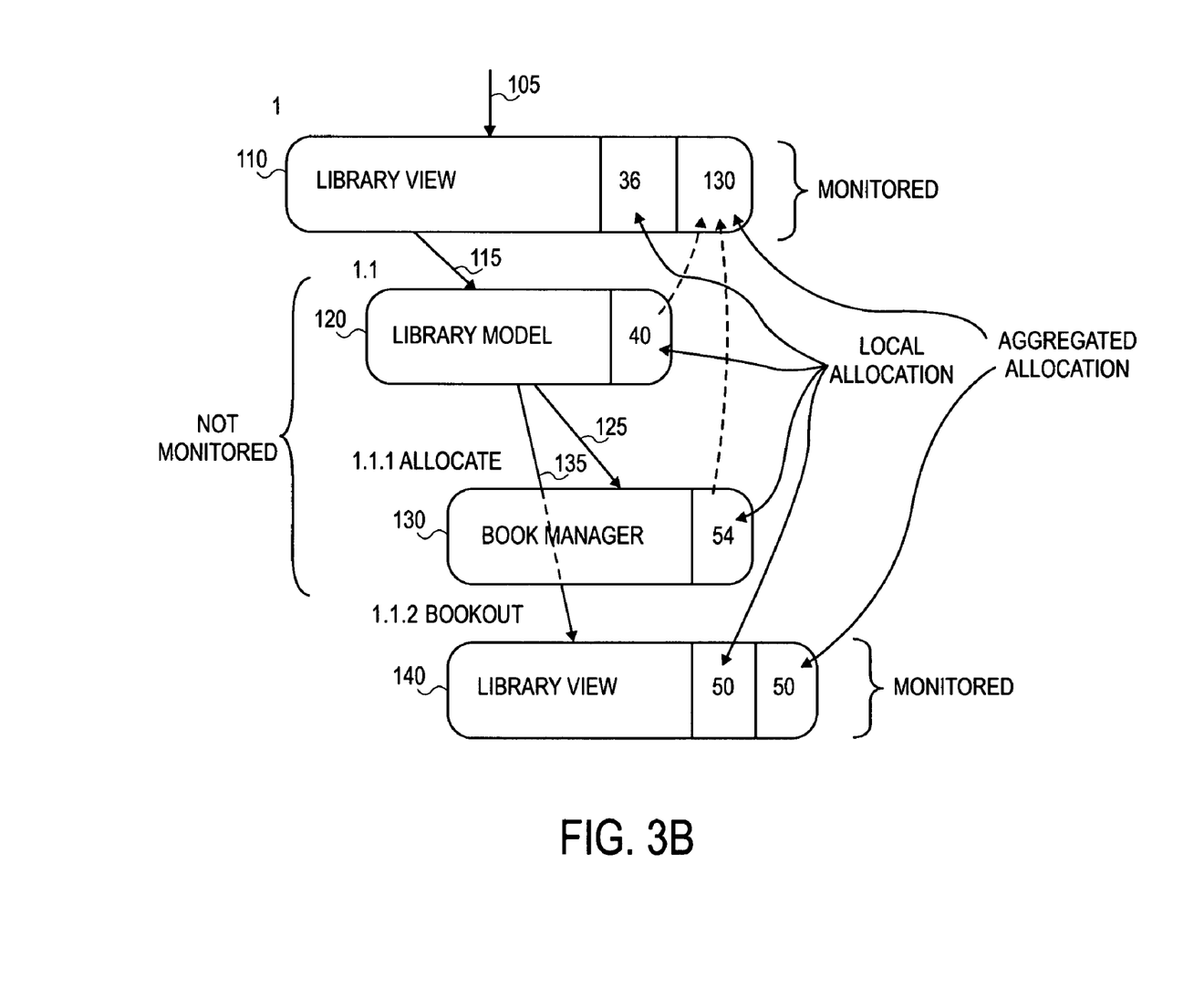
FIG. 3B illustrates another embodiment in which memory allocation can be tracked by a monitoring application where specific classes are targeted for tracking.

For the example illustrated in FIG. 3B, the monitoring to the classes is limited to LibraryController 110 and LibraryView 140, bypassing the backend (LibraryModel 120, BookManager 130) and platform classes (java.*, javax.*, com.sun.*, etc). Thus, although the Application Monitor intercepts the memory allocation for each class, it only displays the memory allocations of the classes that were chosen (in scope of the filter) by the developer. In operation, as a call to a method 105 contained in class LibraryController 110 is made, memory is locally allocated to class LibraryController 110 in the amount of 36 bytes. The calling of the first method 105 triggers the calling of a second method 115 contained in class LibraryModel 120 and memory is locally allocated to class LibraryModel 120 in the amount of 40 bytes. Two additional methods are called as a result of method call 115. A first method is called 125 from class BookManager 130 and memory is locally allocated to class BookManager 130 in the amount of 54 bytes. A second method is called 135 from class LibraryView 140 and memory is locally allocated to class LibraryView 140 in the amount of 50 bytes.

Since the developer only opted to monitor class LibraryController 110 and LibraryView 140, the Application Monitor aggregates some of the foregoing values. Specifically, Classes LibraryModel 120 and BookManager 130 were both called from methods residing in class LibraryController 110. Hence, the locally allocated bytes for LibraryModel 120 and BookManager 130 are aggregated and given to monitored class LibraryController 110. In this example, the aggregated memory for class LibraryController 110 is the summation of the locally allocated memory for class LibraryController 110, LibraryModel 120 and BookManager 130. This summation of bytes can be shown as 35+40+54=130. Hence, monitored class LibraryController 110 is shown as having 130 bytes of aggregated memory. Class LibraryView 140 is also a monitored class. LibraryView 140 was locally allocated 50 bytes. In this example, the methods of LibraryView 140 did not call other methods, so there is no additional allocation to add up. The summation of bytes for LibraryView 140 can be shown as 50+0=50. Hence, Monitored class LibraryView 140 is shown as having 50 bytes of aggregated memory.

Thus, the developer is provided with an aggregated view of memory allocation, thereby simplifying the process of identifying memory leaks. For example, if the aggregated memory allocation for the LibraryController class 110 increases beyond a reasonable level, the developer can assume that either the LibraryController class 110 or one of the classes for which memory is aggregated to the LibraryController class 110 (e.g., the LibraryModel class 120) is the cause of the memory leak. Once the leak is linked to a monitored class, one embodiment of the invention allows the developer to drill down into the monitored class to specifically identify the unmonitored class (which exists in the stack trace) that is the cause of the leak. Further, it is possible to identify the types of created objects, by both monitored and unmonitored classes, which are contributing to the memory growth.

Figure 3C:
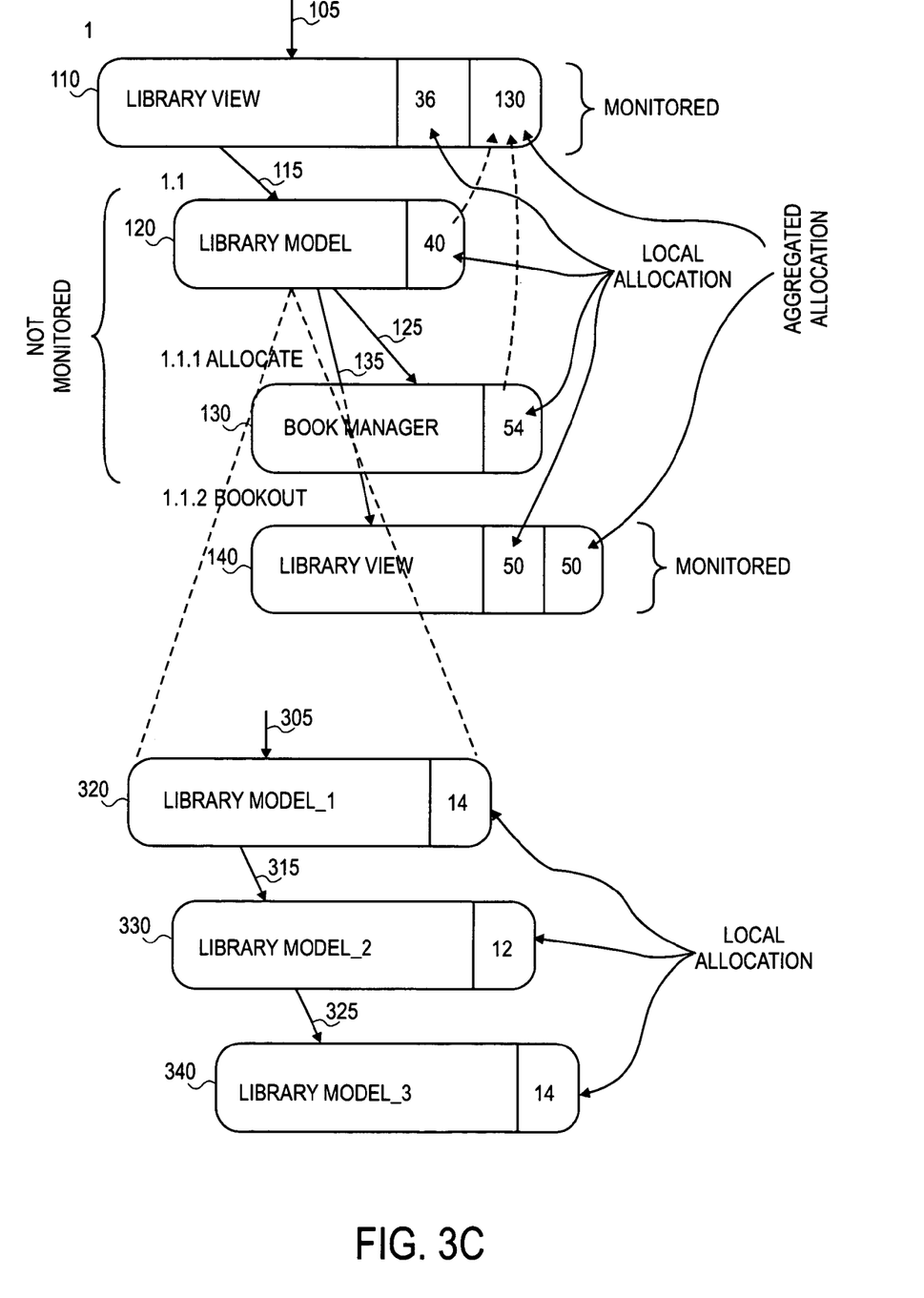
FIG. 3C illustrates another embodiment in which memory allocation can be tracked by a monitoring application where a chosen class can be drilled down into the further analyze the memory allocation of the chosen class and its sub-classes.

Additional layers of aggregation are illustrated in FIG. 3C, which reveals the same kind of inheritance applied to class LibraryModel 120. In this example, the 40 bytes allocated to LibraryModel 120 are actually an aggregation from method calls to three lower-level classes. A call to method 305 contained in class LibraryModel_1 320 is made and memory is locally allocated to class LibraryModel_1 in the amount of 14 bytes. The calling of the first method 305 triggers the calling of a second method 315 contained in class LibraryModel_2 330 and memory is locally allocated to class LibraryModel_2 330 in the amount of 12 bytes. The calling of method 315 triggers the calling of a third method 325 and memory is locally allocated to class LibraryModel_3 340 in the amount of 14 bytes. The summation of these lower level classes is shown as 14+12+14=40 bytes.

Theoretically, the number of levels that a monitored class may be drilled into is unlimited. For example, the aggregate values provided for class LibraryModel_2 330 may represent aggregations of additional layers of classes (e.g., LibraryModel_2_1, LibraryModel_2_2 . . . LibraryModel_2_N).

Identifying Memory Leaks Over Time

In one embodiment of the invention, memory leaks are identified based on the potential leaking class' behavior over time. At a specific point in time, assume a class is allocated 100 bytes by the VM. During a first GC cycle, 50 bytes are deallocated. Such a deallocation would likely have occurred because of the removal of one or more objects created by method calls of the class. At this point the remaining allocated memory is 50 bytes (e.g., 100−50=50). After the first GC cycle, 100 bytes of memory are further allocated to the class, giving a total of 150 bytes. During a second GC cycle, 50 bytes are deallocated leaving a remainder of 100 bytes (e.g., 150−50=100) to the class. Based on this timeframe, one might assume that the class is growing in size and hence causing a leak. However, a longer timeframe should be used to make such determinations. For example, it is possible that upon a third GC cycle, 100 bytes are deallocated bringing the class' allocation down to 1 byte (e.g., 100−99=1). If a longer timeframe were used for analysis, the third GC cycle would have been included (which would have deallocated all but 1 byte of the memory) and no memory leak would have been suspected.

FIG. 3B illustrates the memory allocation for monitored classes at a particular point in time. Although this information is useful in certain respects (e.g., finding classes that have allocated a large amount of memory at a specific snap shot in time), it may be of limited use in determining a memory leak. For instance, at any given point in time, a class may be allocated a significant amount of memory which, after a few GC cycles may return to an initial/stable state. Also, depending on how many active threads are using a class, the "current memory usage" at a specific point in time can vary significantly. Thus, memory leaks should be identified by monitoring memory usage over an extended period of time, i.e., where a determination can be made that "on average" a class' memory usage is growing.

The time span, based on the number of GC cycles, where a class exhibits an increase in memory usage can be quite large. There is no hard answer as to how long a time span is required. This may vary for each application, computing system, or server load. However, it is safe to assume that the longer the time span, the more likely a class is exhibiting a memory leak.

Figure 4:
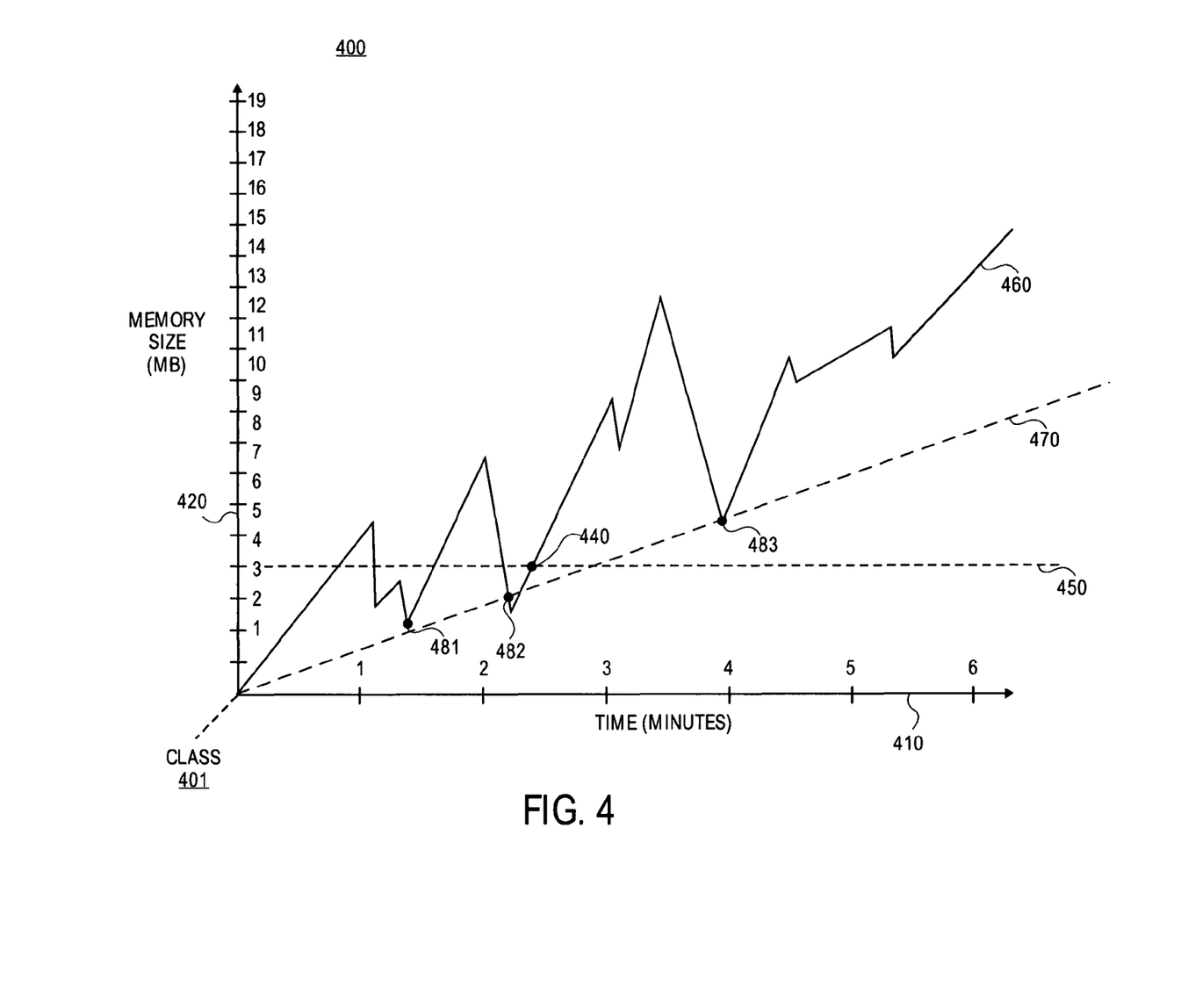
FIG. 4 illustrates a graph depicting the memory allocation and deallocation of a Java class file over a period of time.

FIG. 4 illustrates a graph depicting a potential memory leak within Class 401. The line graph 400 has an X-Axis 410 that displays time in minutes. The Y-Axis 420 displays Memory Size in MB. In other words, the Y-Axis 420 shows how much memory has been allocated to the class. The horizontally dotted line 450 shows a threshold (4 MB) beyond which the memory usage of Class 401 may be considered a "problem."

The solid line 460 displays the amount of memory allocated to Class 401 over a period of time (in this example 6 minutes). In one embodiment, the dotted line 470 represents the gradient of the memory allocated to Class 401 over time. In one embodiment, only the lowest points (e.g., points 481, 482, 483) are used to measure line 470. Hence, if line 470, which is based on the lowest points of memory allocation, continue to increase over time, a memory leak is likely. In another embodiment, line 470 may be a linear regression line, which take the average of all points in predicts a straight line showing where each plot point would likely fall. If the analysis of the memory allocation of Class 401 were limited to 2.5 minutes, one might conclude that the memory usage of Class 401 was not a problem. At this point the memory usage 460 of Class 401 had risen and fallen below threshold 450 twice. However, when the full six minutes illustrated in FIG. 4 is evaluated the memory usage 460 of Class 401 continued to increase on average as indicated by line 470. Based on the results from FIG. 4, a developer might believe that Class 401 (or one of the lower level unmonitored classes) might be the cause of a memory leak.

Further analysis, as described in FIGS. 3B and 3C, may provide a developer with clues as to which method calls and/or objects from Class 401 are causing a memory leak. For example, one a monitored class is identified as the cause of a memory leak, the developer may need to dig down into the sequence of related method calls to identify the underlying class causing the leak. In one embodiment, a graph such as the one illustrated in FIG. 4 may be evaluated for each class called during the course of execution of the monitored class.

Analysis Of "Out of Memory" Errors

When a large computing system such as an enterprise application server (e.g., a J2EE server) starts up, there are numerous components that must be loaded. Potentially, the startup of a given computing system could load ~10,000 classes, ~100 services, and ~100,000 methods. Even on a high-powered computing system, such a boot sequence may require many minutes to complete.

Once such a large computing system is running, an undiscovered memory leak may trigger an "OOM" error. Depending on the gradient 470 of the leak, the time before such an error occurs may vary greatly. For example a memory leak that increase by 1 byte per minute may take years to occur, whereas a memory leak that increases 1 MB per minute may occur within minutes or hours. Out of memory errors are more likely to occur on production systems under heavy load where it may not be possible to monitor classes chosen by a developer as "Monitored" classes. Although such constant monitoring is an invaluable tool during development, the monitoring itself requires memory to run. This memory would otherwise be available for production applications.

Figure 5:
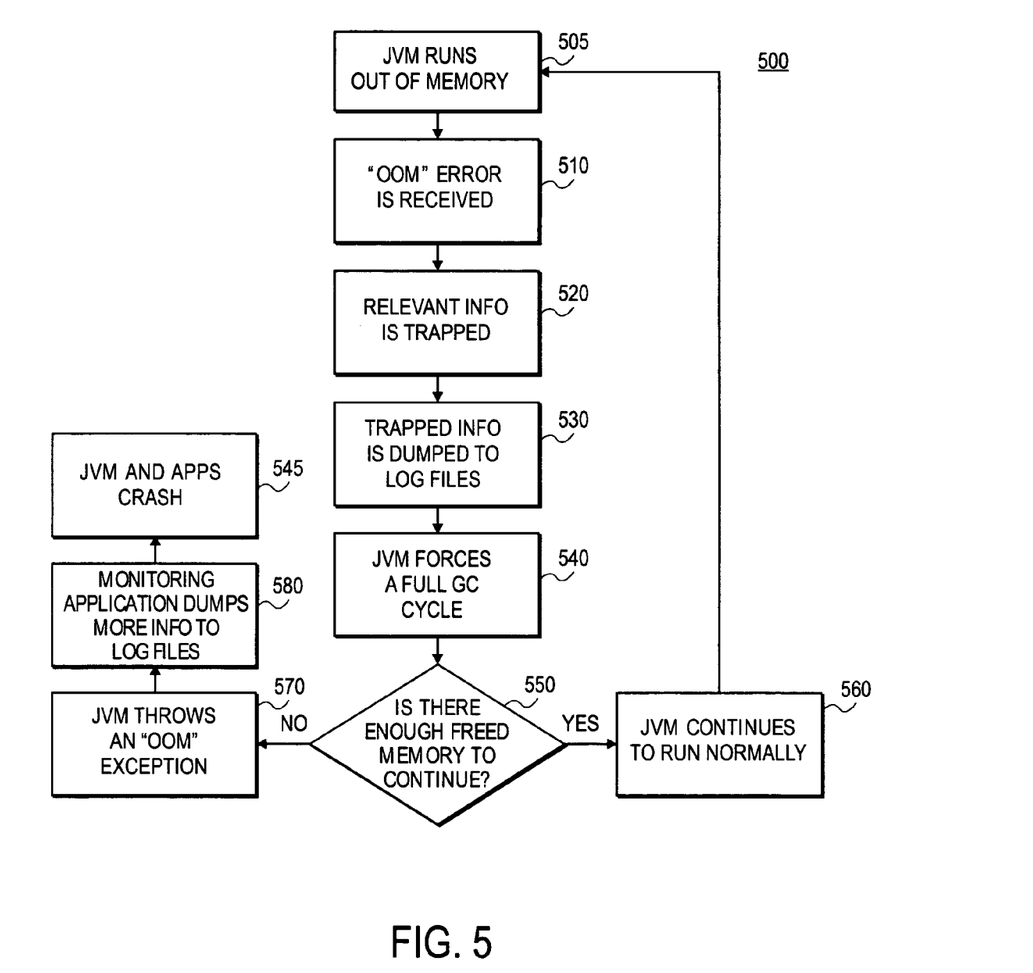
FIG. 5 illustrates the process in which a monitoring application handles an "Out of Memory" error that occurred within a Java VM.

In order for the Application Monitor to provide analysis of an "OOM" error without constantly monitoring classes (and consuming memory resources), an "OOM Trap Tool" may be used. FIG. 5 illustrates the process in which an "OOM Trap Tool" analyzes a runtime environment during an "OOM" error and potential VM crash. When a VM of a computing system has run out of available memory 505, the VM displays an "OOM" error 510. Next, the "OOM Trap Tool" traps or captures 520 some relevant information (e.g., allocated memory of objects, currently method calls waiting for memory to create objects, etc) that existed right before the "OOM" error occurred. The relevant information allows a developer to know which components (e.g., objects) were using memory at the time of the "OOM" error. Next, the "OOM Trap Tool" dumps 530 the relevant information to a log file or database. In other embodiments, the relevant information could also be passed to telnet console window or to stdout. Normally, when an "OOM" error occurs, the Java VM forces a full GC cycle 540 to recover as much memory as possible in order to continue to run. If enough memory is recovered 550 to keep running, the VM continues to run normally 560 until, if at all, another "OOM" error occurs 505. If not enough memory can be obtained to allow the VM and/or application(s) to continue to run 550, than the VM throws an "OOM" exception 570. At this point, the Application Monitor requests a full heap dump 580 from the VM and dumps some more memory statistics 590 to the log file(s) or database. Lastly, the VM itself and applications running in the VM crash 595, requiring a restart(s).

Certifying Classes to be Free from Memory Leaks

In the prior art, once a class has been shown to be free from memory leaks (e.g., the object(s) created based on the class do not grow over time), no certification process exists to indicate that the class is free from defects. Offering a certification of a class would be advantageous and an improvement over the prior art.

In one embodiment, a certification is provided that certifies that a given class is free from memory leaks. In another embodiment, a Java Servlet application could be certified as free of memory leaks. This would require the individual certification of each class with the Servlet application as being free from leaks. Hence, certification could be used to announce that a given application is free from memory leaks when running on a specific application server and under a specific environment.

The advantage of certifying classes and/or entire applications proves useful in a server environment where multiple applications may run concurrently. If memory leaks are detected on such a server, developers can be certain that the certified classes and/or applications are not the source of such memory problems.

Such certification can be further useful if an application developer out-sources an application to a customer in which the customer is able to add on to, or customize the application. If the application has been certified before upon its outsourcing, the developer can be sure that any future memory leaks are not the result of the application when it was outsourced. By process of elimination, the developer could be confident that any additions to and/or edits of the application, by the customer, would likely be the cause of memory leaks. Such a certification offers the developer piece of mind that their code is free from memory leaks before it was released to third parties.

The server may be Java 2 Enterprise Edition ("J2EE") server nodes, which support Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions, which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 6:
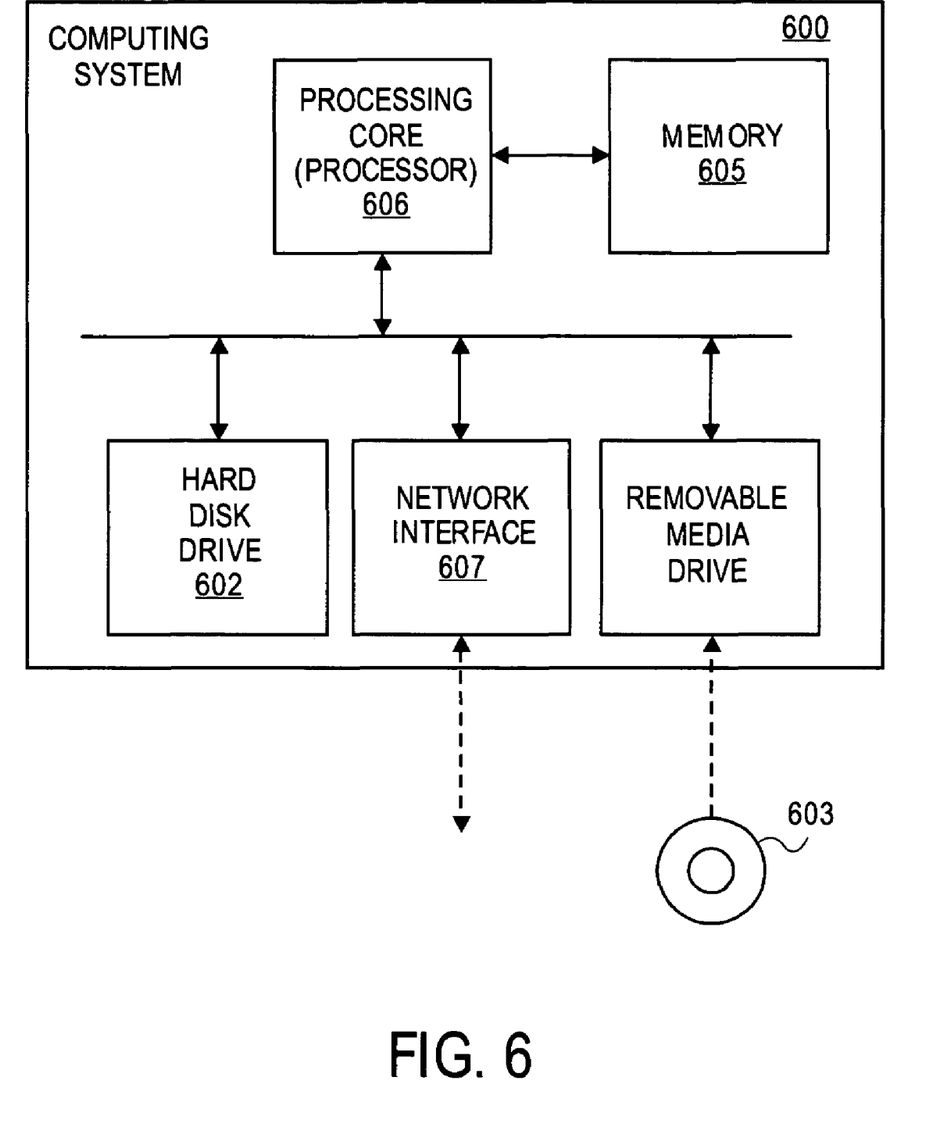
FIG. 6 illustrates a block diagram of a computing system that can execute program code stored by an article of manufacture.

FIG. 6 illustrates a block diagram of a computing system 800 that can execute program code stored by an article of manufacture. It is important to recognize that the computing system block diagram of FIG. 6 is just one of various computing system architectures. The applicable article of manufacture may include one or more fixed components (such as a hard disk drive 602 or memory 605) and/or various movable components such as a CD ROM 603, a compact disc, a magnetic tape, etc. In order to execute the program code, typically instructions of the program code are loaded into the Random Access Memory (RAM) 605; and, the processing core 606 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 606.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

APPENDIX

```
01 public class LibraryView implements LibraryModelObserver {
02 private String __userId;
03 private String __status;
04 private String __orderId;
05
06 public void bookOut(String isbn) {
07 __status = __userId+" allocates "+isbn; // 50 for the string (non-garbage)
08 updateTable( );
09 refresh( );
10 }
11
12 public void displayOrderId(String orderId) {
13 __orderId = orderId;
14 refresh( );
15 }
```

APPENDIX-continued

```
16 }
01 public interface LibraryModelObserver {
02 void bookOut(String isbn);
03 }
01 public class LibraryModel {
02 private BookManager __bookman;
03 private LinkedList __observers;
04
05 public void allocateBook(String isbn) {
06 __bookman.allocate(isbn); // result is thrown away (becoming garbage)
07 Iterator i = __observers.iterator( ); // 40 bytes for the Iterator object (garbage)
08 while(i.hasNext( )) {
09 LibraryModelObserver o = (LibraryModelObserver) i.next( );
10 o.bookOut(isbn);
11 }
12 }
13 }
01 class BookManager {
02 private static String ALLOC_STMT = "INSERT INTO ALLOCS (isbn, code) VALUES (?, ?)";
03
04 private Connection __dbConn;
05
06 String allocate(String isbn) {
07 String code = isbn+'#'+System.currentTimeMillis( ); // 54 bytes for the string
08 storeAllocation(isbn, code);
09 return code;
10 }
11
12 private storeAllocation(String isbn, String code) {
13 PreparedStatement stmt = __dbConn.prepareStatement(ALLOC_STMT);
14 stmt.setString(1, isbn);
15 stmt.setString(2, code);
16 stmt.executeUpdate( );
17 }
18 }
```

What is claimed is:

1. A computer-implemented method comprising:
   defining a subset of classes to be monitored in an object oriented software application on a virtual machine, each class in the monitored subset having at least one method;
   intercepting, using one or more processors, a first method call associated with a monitored class;
   linking a measurement of memory allocated for use by the monitored class to the monitored class;
   intercepting, using the one or more processors, a second method call associated with an unmonitored class, the second method call resulting from the first method call; and
   aggregating a measurement of memory allocated for use by the unmonitored class to the measurement linked to the monitored class.

2. The computer-implemented method of claim 1, wherein said classes are Java class files.

3. The computer-implemented method of claim 1 further comprising:
   performing the linking and aggregating during an interval between a first garbage collection cycle and a second garbage collection cycle.

4. The computer-implemented method of claim 3 further comprising:
   determining an amount of memory deallocated during said second garbage collection cycle for each of the monitored classes and unmonitored classes.

5. The computer-implemented method of claim 4 further comprising:

defining a total memory for each of the monitored classes and unmonitored classes by subtracting the amount of deallocated memory for each of the monitored classes and unmonitored classes from the amount of allocated memory from each of the monitored classes and unmonitored classes.

6. An article of manufacture storing, on a tangible medium, program code which, when executed by a computer-implemented system, causes the computer-implemented system to execute a method, the method comprising:

defining a subset of classes to be monitored in an object oriented software application on a virtual machine, each class in the monitored subset having at least one method;

intercepting a first method call associated with a monitored class;

linking a measurement of memory allocated for use by the monitored class to the monitored class;

intercepting a second method call associated with an unmonitored class, the second method call resulting from the first method call; and aggregating a measurement of memory allocated for use by the unmonitored class to the measurement linked to the monitored class.

7. The article of manufacture of claim 6, further comprising performing the linking and aggregating during an interval between a first garbage collection cycle and a second garbage collection cycle.

8. The article of manufacture of claim 7, further comprising determining an amount of memory deallocated during said second garbage collection cycle for each of the monitored classes and unmonitored classes.

9. The article of manufacture of claim 8, further comprising defining a total memory for each of the monitored classes and unmonitored classes by subtracting the amount of deallocated memory for each of the monitored classes and unmonitored classes from the amount of allocated memory from each of the monitored classes and unmonitored classes.

* * * * *